(12) United States Patent
Oh et al.

(10) Patent No.: US 8,213,500 B2
(45) Date of Patent: Jul. 3, 2012

(54) METHODS AND SYSTEMS FOR PROCESSING FILM GRAIN NOISE

(75) Inventors: Byung Tae Oh, Los Angeles, CA (US); Shawmin Lei, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1392 days.

(21) Appl. No.: 11/775,738

(22) Filed: Jul. 10, 2007

(65) Prior Publication Data

US 2008/0152296 A1    Jun. 26, 2008

Related U.S. Application Data

(63) Continuation-in-part of application No. 11/614,924, filed on Dec. 21, 2006, now Pat. No. 7,742,652.

(60) Provisional application No. 60/909,415, filed on Mar. 30, 2007.

(51) Int. Cl.
H04N 11/04    (2006.01)

(52) U.S. Cl. .......... 375/240.01; 375/240.11; 375/240.12; 375/240.25; 375/240.27; 382/232; 382/235; 382/254; 382/260; 382/266; 348/606; 348/607; 348/608; 386/269; 386/264

(58) Field of Classification Search .................. None
See application file for complete search history.

(56) References Cited

U.S. PATENT DOCUMENTS

| 6,148,116 | A  * | 11/2000 | Park et al. ................. 382/266 |
| 6,453,056 | B2 | 9/2002 | Laumeyer et al. |
| 6,546,117 | B1 | 4/2003 | Sun et al. |
| 6,743,020 | B2 | 6/2004 | Pestl |
| 7,086,735 | B1 | 8/2006 | Provitola |
| 7,102,669 | B2 * | 9/2006 | Skow ...................... 348/222.1 |
| 7,596,239 | B2 * | 9/2009 | Winger et al. ............. 382/100 |
| 7,643,699 | B2 * | 1/2010 | Lim et al. ................. 382/275 |
| 7,715,477 | B2 * | 5/2010 | Garrido et al. ......... 375/240.11 |
| 7,738,722 | B2 * | 6/2010 | Gomila et al. ............ 382/254 |
| 7,742,652 | B2 * | 6/2010 | Oh et al. .................. 382/260 |
| 7,873,210 | B2 * | 1/2011 | Novosad ................... 382/162 |
| 7,982,743 | B2 * | 7/2011 | Cooper et al. ............ 345/581 |
| 8,009,732 | B2 * | 8/2011 | Bhaskaran ............. 375/240.12 |
| 8,094,711 | B2 * | 1/2012 | Tourapis et al. ........ 375/240.01 |
| 2006/0083314 | A1 | 4/2006 | Cooper |
| 2006/0083316 | A1 * | 4/2006 | Cooper et al. ......... 375/240.25 |
| 2006/0083426 | A1 | 4/2006 | Cooper |
| 2006/0182183 | A1 * | 8/2006 | Winger .................. 375/240.27 |
| 2006/0215767 | A1 * | 9/2006 | Gomila et al. .......... 375/240.25 |
| 2006/0291557 | A1 * | 12/2006 | Tourapis ................ 375/240.12 |

(Continued)

FOREIGN PATENT DOCUMENTS

EP    1511319 A1    3/2005

(Continued)

OTHER PUBLICATIONS

Notice of Allowance for U.S. Appl. No. 11/614,924 mailed Feb. 8, 2010.

(Continued)

Primary Examiner — Syed A. Zia
(74) Attorney, Agent, or Firm — Michael Blaine Brooks, PC; Pejman Yedidsion; David Ripma

(57) ABSTRACT

Embodiments of the present invention comprise systems and methods for image noise characterization, parameterization, removal, reconstruction and/or re-combination with a denoised image.

17 Claims, 4 Drawing Sheets

U.S. PATENT DOCUMENTS

| | | | |
|---|---|---|---|
| 2007/0036452 A1* | 2/2007 | Llach et al. | 382/254 |
| 2010/0238353 A1* | 9/2010 | Lin | 348/607 |
| 2011/0298974 A1* | 12/2011 | Garrido et al. | 348/441 |
| 2012/0062797 A1* | 3/2012 | Segall | 348/606 |
| 2012/0063694 A1* | 3/2012 | Segall | 382/235 |

FOREIGN PATENT DOCUMENTS

| | | |
|---|---|---|
| EP | 1511320 A1 | 3/2005 |
| WO | WO2004095829 | 11/2004 |
| WO | WO2005027045 | 3/2005 |
| WO | WO2005032143 | 4/2005 |
| WO | WO2005034518 | 4/2005 |
| WO | WO2006044684 | 4/2006 |
| WO | WO2006047138 | 5/2006 |
| WO | WO2006055193 | 5/2006 |
| WO | WO2006055208 | 5/2006 |
| WO | WO2006057703 | 6/2006 |

OTHER PUBLICATIONS

A. Buades, B. Coll, and J.M. Morel, "A review of image denoising algorithms, with a new one", Multiscale Model. Simul., 4, pp. 490-530, 2005.

M. Malfait, D. Roose, "Wavelet-based image denoising using a Markov random field a priori model", IEEE Transactions on Image Processing, vol. 6, pp. 549-565, 1997.

T. M. Moldovan, S. Roth, M.J. Black, "Denoising archival films using a learned Bayesian model," in Proceedings of IEEE International Conference on Image Processing, 2006.

M. K. Ozkan, M. I. Sezan, and W. Philips, "Adaptive motion-compensated filtering of noisy image sequences," IEEE Transactions on Circuit and Systems for Video Technology, vol. 3, pp. 277-290, 1993.

A. Pizurica, V. Zlokolica, and W. Philips, "Noise reduction in video sequences using wavelet-domain and temporal filtering," in in SPIE Conference on Wavelet Applications in Industrial Processing, 2003.

Cristina Gomila, Alexander Kobilansky, Thomson Licensing Inc "SEI message for film grain encoding", document JVT-H022, JVT of ISO/IEC MPEG & ITU-T VCEG, 8th meeting, Geneva, May 2003.

Tomasi, C.and Maduchi, R., "Bilateral Filtering for Gray and Color Images,"Proceedings of the IEEE International Conference on Computer Vision, 1998, Bombay, India.

Mallat,Stephane and Zhong,Sifen,"Characterization of Signals from Multiscale Edges."IEEE Transactions on Pattern Analysis and Machine Intelligence, vol. 14, No. 7. Jul. 1992.

Canny, John,"A Computational Approach to Edge Detection,"IEEE Transactions on Pattern Analysis and Machine Intelligence, vol. PAMI-8, No. 6, 1986.

Xiong, Orchard, and Zhang,"A Deblocking Algorithm for JPEG Compressed Images Using Overcomplete Wavelet Representations,"IEEE Trans, Circuits and Systems fro Video Tech.,1997.

* cited by examiner

EM = f(EE$_1$, EE$_2$, EE$_3$) U g(D$_1$, D$_2$, D$_3$) ← 47

ND SYSTEMS FOR
PROCESSING FILM GRAIN NOISE

RELATED REFERENCES

This application claims the benefit of U.S. Provisional Patent Application No. 60/909,415, entitled "Methods and Systems for Processing Film Grain Noise," filed on Mar. 30, 2007; this application is also a continuation-in-part of U.S. patent application Ser. No. 11/614,924, entitled "Methods and Systems for Image Noise Processing," filed on Dec. 21, 2006, now U.S. Pat. No. 7,742,652, by Byung Tae Oh and Shawmin Lei. All applications listed in this section are hereby incorporated herein by reference.

FIELD OF THE INVENTION

Embodiments of the present invention comprise methods and systems for processing image noise.

BACKGROUND

Film grain noise in motion pictures is caused by the developing process of silver-halide crystals dispersed in photographic emulsion. Due to the natural physical process, it is unavoidable in the analog film. When we digitize and compress movie contents by scanning the analog film, such randomly distributed film grain noise is a major burden for typical video coding systems due to its high entropy. Since film grain noise has a relatively larger energy level in the high frequency band, the block-based encoder in the current video coding standards is not efficient even in the DCT domain. Current encoders also suffer from inaccurate motion estimation.

SUMMARY

Some embodiments of the present invention comprise methods and systems for processing image noise. In some embodiments, film grain noise attributes are measured. In some embodiments, noise may be removed from an image. In some embodiments, noise may be reconstructed and recombined with an image. In some embodiments, noise characteristics may be transmitted to a decoder for noise reconstruction. In some embodiments, noise characteristics may be measured, noise may be removed from an image, the image may then be encoded and transmitted to a destination with noise parameters. The image and the noise may then be reconstructed at the destination and combined.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1:
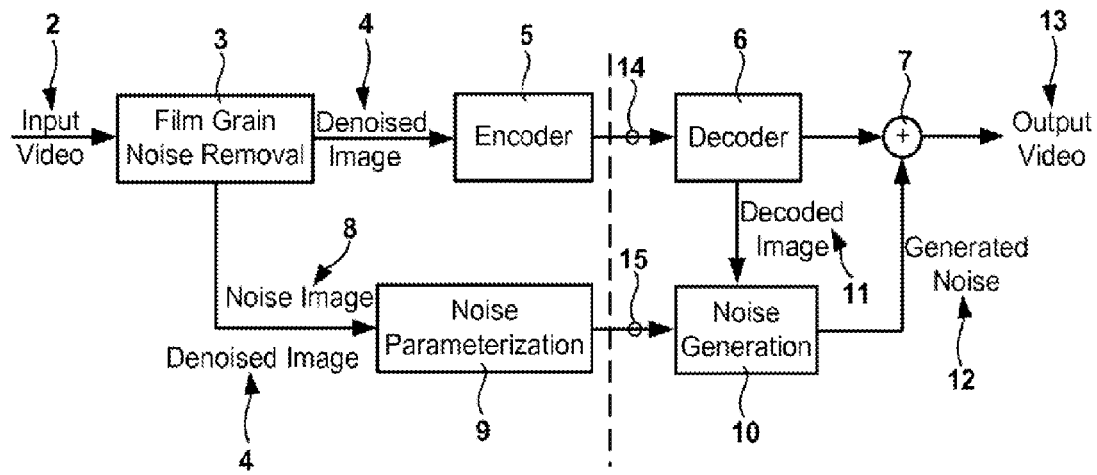
FIG. 1 is a diagram showing embodiments of the present invention comprising noise removal, parameterization, transmission and reconstruction.

Embodiments of the present invention comprise methods and systems for film grain noise extraction, parameterization, modeling and synthesis. Some embodiments may be applied to high definition video coding. For some observers, film grain noise boosts the natural appearance of pictures in high definition video and should be preserved in coded video. However, the coding of video contents with film grain noise is expensive. In some embodiments, film grain noise may be extracted from the input video as a pre-processing step (at the encoder). Substitute noise may then be re-synthesized and added back to the decoded video as a post-processing step (at the decoder). Under this framework, the coding gain of the denoised video is higher while the quality of the final reconstructed video is still high. To implement such a scheme, a technique is used to remove film grain noise from image/video without significantly distorting its original content. A parametric model consisting of a small set of parameters to represent the extracted film grain noise may also be generated. This model may be used to generate film grain noise that is a close facsimile to the extracted noise in terms of power spectral density and cross-channel spectral correlation.

Introduction

Some embodiments of the present invention remove film grain noise, at least partially, to achieve a higher coding gain. This may be performed as a pre-processing phase at the encoder. In some embodiments the film grain noise may be re-synthesized and added back to the decoded video as a post-processing step at the decoder.

Operating under the assumption that film grain noise is a Gaussian additive or multiplicative noise, some existing denoising methods could also be used. However, in some cases, film grain noise has several special properties, mentioned below, that make it quite different from traditional Gaussian noise.

1. It is temporally independent.
2. Its power spectrum density is close to pink.
3. It has strong cross-color correlation in the RGB domain.
4. It has a close-to-Gaussian distribution.
5. It is dependent on signal intensity.

These properties are so distinct that it can be beneficial to develop a specific algorithm for film grain noise detection, modeling and removal to achieve a higher video coding gain. On the other hand, film grain noise is perceptually important at the decoder. As high resolution devices such as HDTV are getting popular, film grain noise becomes more visible to the human eye. Removal of film grain noise may make an image appear unnatural to an observer, therefore, to improve the natural appearance of an image, the noise may need to be reproduced and rendered at the decoder side.

Some embodiments of the present invention comprise methods and systems for removing film grain noise from general input sequences using properties of the noise and without significantly distorting the original content. In a denoising step, these embodiments may comprise methods using total variation minimization in order to involve film grain properties at the encoder side. The denoising process may enable effective suppression of film grain noise so that the video coding gain may be dramatically increased. Some embodiments comprise methods for decreasing distortion of the original image. Distortion of the image can lead to false extraction of film grain noise and, consequently, inaccurate noise parameters.

Some embodiments comprise methods and systems for detecting possible edge or fine-texture regions of input image sequences in advance and for suppressing noise selectively for non-edge homogenous regions only. In some embodiments, film grain may be extracted to identify one or more parameters. These parameters may be used to generate a substantially similar noise at the decoder side. Some embodiments comprise noise generation methods that capture the unique properties of film grain noise.

Overview of Embodiments for Film Grain Noise Processing

Some embodiments of the present invention comprise methods and systems for noise removal and extraction at the encoder, other embodiments comprise methods and systems for noise synthesis at the decoder and some embodiments comprise methods and systems for both encoder and decoder functions. These encoder and decoder functions can be viewed as pre-processing and post-processing for video compression. In some embodiments, these functions can be accomplished without modification of existing encoding and decoding modules that are compliant with current video coding standards. In some embodiments, the only additional information to be transmitted, beyond image data, is noise parameters, which may be used to synthesize noise at the decoder. Since a small set of parameters can represent the noise of a whole image, or a set of images in a group of pictures (GOP), the overhead of parameter transmission can be negligible.

Some embodiments of the present invention may be described with reference to FIG. 1. In these embodiments, an input video sequence 2 is input to a noise removal module 3 wherein the film grain noise may be analyzed and extracted from the original input sequence 2. This process may result in a denoised image 4 that may be sent to an encoder 5 and may be sent to a noise parameterization module 9. The extracted noise image 8 may also be sent to the noise parameterization module 9. The denoised image 4 may then be encoded by the encoder 5. In some embodiments, processes performed in the encoder may comprise transformation, quantization, arithmetic encoding and other processes. In some embodiments, noise parameterization module 9 may comprise noise analysis, measurement and other processes. In some embodiments, noise parameters 15 output from the noise parameterization module 9 may be combined with the encoded image 14 on the encoder side before transmission to the decoder-side system. In other embodiments, the encoded image 14 may be transmitted separately from the noise parameters 15. The encoded image 14 may be transmitted to a decoder 6 to decode the encoded image 14 image. In some embodiments, a decoder 6 may perform processes comprising arithmetic decoding, dequantization, inverse transformation and other processes. In some embodiments, a decoded image 11 may be sent to a noise generation module 10. A synthetic noise 12 may then be generated in the noise generation module 10. In some embodiments, the synthetic noise 12 will be substantially similar to the extracted noise 8 and will be based on the noise parameters 15 derived from the extracted noise 8 and/or the denoised image 4. The synthetic noise 12 may then be combined 7 with the decoded image to form an output image 13.

Film Grain Noise Removal

Some embodiments of the present invention may utilize a total variation minimization method to suppress or remove film grain noise. In some cases, a typical application of this type of denoising operation may distort the original image, especially some areas that have a sharp transition between neighboring pixels. Accordingly, in some embodiments, image edges may be identified and isolated before a denoising operation. Some embodiments may then comprise selective denoising in non-edge regions only. Some embodiments of the present invention comprising denoising methods using a total variation method may utilize some noise a priori information for better noise estimation. Some of these embodiments may comprise temporal domain methods to identify the noise a priori.

Figure 2:
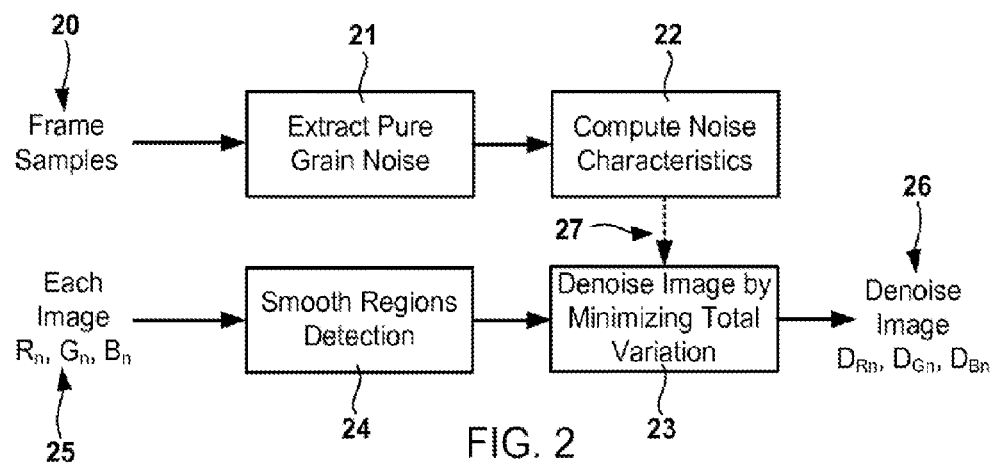
FIG. 2 is a diagram showing noise extraction and characterization.

Some embodiments of the present invention comprise three distinct encoder-side functions: 1) extracting noise properties using temporal information, 2) identifying smooth regions of the image, and 3) denoising each image frame using noise a priori information. Some of these embodiments may be described with reference to FIG. 2. In these embodiments, a video frame sampling set 20 serves as input to a noise extraction module 21. Noise properties do not necessarily need to be measured for each frame of a sequence. In some embodiments, a single frame or set of frames may be used to obtain noise characteristics for an entire video clip, movie or other sequence. Accordingly, the video frame sampling set may comprise one or more frames selected from a complete sequence. Noise may be extracted from these frames in the noise extraction module 21. This noise may be sent to a noise parameterization module 22, which may measure noise characteristics and classify them as noise parameters. These noise parameters may then be sent to a denoising module 23 for use in denoising operations.

In some embodiments, a sequence to be processed may comprise individual red, green and blue (R, G and B) color channels 25. Each frame of each color channel may be processed. Frames are input to a smooth region detection module 24 wherein smooth regions of frame images are detected. More specific smooth region detection methods are described below. Noise may then be removed from these frames with the denoising module 23. In some embodiments, this may comprise minimization of total variation. The product of these processes is a denoised image 26 and noise parameters 27, which may be used in subsequent noise generation processes.

Extracting Noise Characteristics

Some embodiments of the present invention may utilize the unique properties of film grain noise. Since the grain pattern may be different for different kinds of films, some embodiments may identify the characteristics of the film grain. In some embodiments, film grain characteristics may be obtained by differentiation of two independent film grain noise patterns.

$$U_o^n = U^n + N(U^n) \quad (1)$$

In some embodiments, the assumption that film grain is additive may be made, as shown in Eqn. 1, where Uo is the observed image, U is the pure image, N is film grain noise, and n indicates the $n^{th}$ frame. Since the film grain noise is signal dependent, the noise, N, can be represented as a function of the pure image U. Then, if the blocks of two consecutive frames are static, we can extract the new noise $N^d$ as shown in Eqn. 2. In some embodiments, this is performed only in static areas of images to make this algorithm robust for motion change $$N^d = N^n - N^{n-1} \quad (2)$$
$$= (U_o^n - U^n) - (U_o^{n-1} - U^{n-1})$$
$$\approx U_o^n - U_o^{n-1}$$

Film grain noise has been found to be almost temporally independent and spatially Gaussian. Therefore, the difference of two independent Gaussian noise patterns, $N^d$ would be another Gaussian noise with double variance. As a result, auto-correlation and cross-color correlation values of noise can be easily obtained with temporally extracted noise patterns.

The step of determining noise characteristics may be independent of any denoising steps, and these noise parameters can be used for a whole video sequence or a set of images. In some embodiments, it is unnecessary to obtain the parameters for every single frame.

Edge Detection

For input image sequences that contain film grain noise, some simple edge detection methods do not work well because these filters are sensitive to local noise. In some embodiments, noise may be suppressed to facilitate edge detection. To extract edges from the input image effectively, a set of filters may be employed to maximize the frequency selectivity. These filters may comprise a pair of low- and high-pass filters, such as given below.

$$h = \frac{1}{8}[-1 \ 2 \ 6 \ 2 \ -1], g = \frac{1}{2}[1 \ 0 \ -1] \quad (3)$$

These embodiments may comprise three filters $f_1=h*g$, $f_2=h*up(g)$, $f_3=h*up(up(g))$, where $up(\cdot)$ indicates an upsampling operation, and * identifies a convolution operation. These filters may be processed for both horizontal and vertical directions to detect all possible edge orientations. Using the same terminology as wavelet theory, each filter, $f_i$ makes an $LH_i$ and an $HL_i$ output image. In some embodiments, an edge energy map(EE) may be obtained through combining the results of filter operations, as in Eqn. 4. In some embodiments, a unified edge energy map may be calculated by methods such as that shown in Eqn. 5, where the maximum operation processes pixel-by-pixel.

$$EE_i=|LH_i|+|HL_i|, i=1,2,3 \quad (4)$$

$$EE=\max[EE_1, EE_2, EE_3] \quad (5)$$

In some embodiments, a binary edge map (EM) may be obtained by simple thresholding, e.g., if the value of EE(i,j) is larger than a predetermined threshold value, a pixel may be assumed to be an edge. In some embodiments, an edge threshold value may be signal-intensity-dependent due to the film grain noise property. In some embodiments, the threshold value may be adjusted according to the noise level of the target pixel on a pixel-by-pixel basis. In some embodiments, this adjustment may be performed in smooth areas only, e.g., with the edge map value equal to 0.

The adjustment of the edge threshold value may be defined as follows $$Th_{new}[L]=(1-w)\cdot Th_{old}[L]+w\cdot c\cdot EE \quad (6)$$

where a weighting coefficient, w, may be set to be a small number, e.g., $10^{-4}$, to avoid an abrupt change and L denotes the background signal luminance. In an exemplary embodiment, an 8-bit image needs an array of 256 levels to store these threshold values. Coefficient c is a scaling factor used to adjust the input value. This coefficient is introduced since each pixel value of EE can be assumed as the mean of EE and the mean value is proportional to the threshold values. Based on theoretical analysis, it has been found that c=2.5 would help detect more than 99% of film grain noises, under the assumption that film grain noise is Gaussian distributed. Here, the L value may be quantized by a certain step size Q_step via $$L=\text{floor}(U(i,j)/Q\_\text{step}). \quad (7)$$

In an exemplary embodiment, Q_step=16.

Fine Texture Detection

Figure 3:
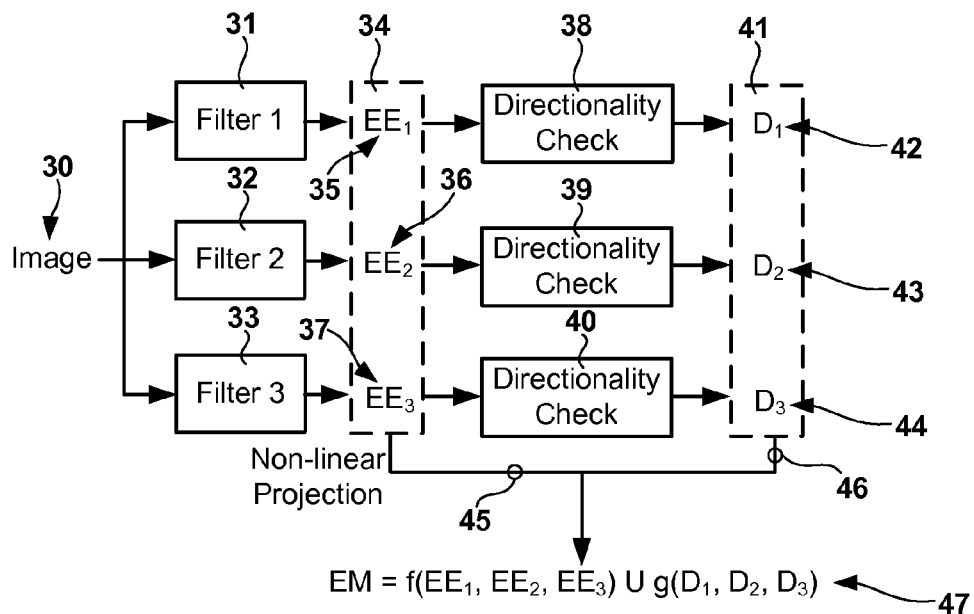
FIG. 3 is a diagram showing an edge map determination process of some embodiments.

When detecting an edge map using one or more edge energy maps, the main difficulty is to detect fine texture regions of the image. Since these image pixels have low edge energy, thresholding methods may result in false detection. Due to the repeated pattern, however, the noise may be perceptually visible in spite of its low edge energy. In order to overcome this problem, a fine texture detection module may be used as a post-processing stage as shown in FIG. 3. In some embodiments, the composite edge map may be obtained by a union of two results.

Some embodiments of the present invention may be described with reference to FIG. 3. In these embodiments, an input image 30 is filtered using one or more filtering processes 31-33. In some embodiments, these filtering processes may correspond to processes described in Equations 3 and 4 above. The results 35-37 of these filtering operations may be combined, such as through Equation 5 or by other methods to form a combined filter result 45. In some embodiments, the combined filter result 45 may be a maximum value of the filter results 35-37. A directionality check 38-40 may then be performed on these filter results 35-37 to determine additional edge characteristics. The results of the directionality checks 42-44 may also be combined to form a combined directionality result 46. A final edge map determination 47 may be determined by a union of the combined filter result 45 and the combined directionality result 46.

Figure 4:
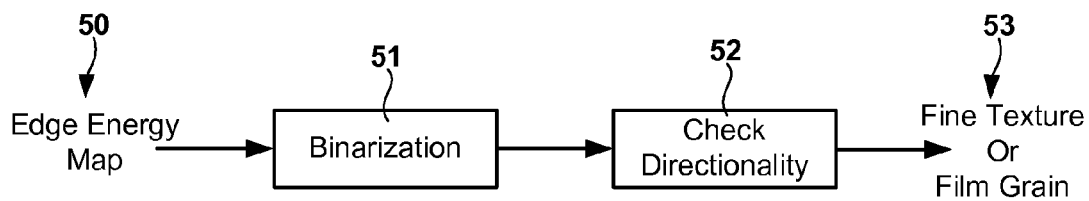
FIG. 4 is a diagram showing a directionality check process.

A fine texture detection procedure of some embodiments may be described in relation to FIG. 4. In these embodiments, an edge energy map 50 may be binarized 51 as a normalization step. The binarized image may then be checked to determine if it has strong directionality 52. In some embodiments, this may be performed by computing auto-correlation values in 8 directions. In the discrete domain, this may be approximated by defining the 8-directions as (m, n)={(1,0), (2,1), (1,1), (1,2), (0,1), (-1,2), (-1,1), (-2,1), (-1,0) }, where (m, n) is the index of the auto-correlation values of the binarized edge energy map. Since film grain noise has no directionality, the maximum correlation value of film grain noise is typically smaller than that of fine texture. However, this process may yield false positives in the case where the correlation value of film grain noise has a large value. To solve this problem, some embodiments may check the correlation value twice. For example, if the maximum direction is on R(m,n), then R(2 m,2 n) is also checked, and a final decision map may be obtained by multiplying these two values, i.e. R(m,n)×R(2 m,2 n).

Denoising by Minimizing Total Variation

As mentioned above, in some embodiments, the denoising process may only be applied to smooth regions of an image. These regions may be identified by methods described above or by other methods. In some embodiments, a simple smoothing filter, such as Gaussian filter, can be used. However, filter performance may be improved by using a priori information of film grain noise. Since film grain noise has special properties, an estimate of the noise behavior can be beneficial. In some embodiments, a total variation minimization approach performs well, since we can use a priori information as constraints when finding a denoised image. In the additive noise model described in Eqn. 1, the goal is to reconstruct a pure, noise-free image U given an observed, noisy image Uo. In a total variation method, the energy function may be defined as Eqn. 8.

$$F(U) = \int_\Omega |\nabla U| dU \qquad (8)$$

Then we can solve the following optimization problem $$\min_U F(U) \quad s.t. \|U - U_o\|^2 = \sigma^2 \qquad (9)$$

where we assume that the noise is white. Using Lagrange's theorem, the best estimator can be written as Eqn. 10.

$$U = \underset{U}{\operatorname{argmin}}\left[F(U) + \frac{\lambda}{2}\|U - U_o\|^2\right] \qquad (10)$$

$$= \underset{U}{\operatorname{argmin}}\left[\int_\Omega \sqrt{U_x^2 + U_y^2}\,du + \frac{\lambda}{2}\int_\Omega (U - U_o)^2 du\right]$$

To solve the optimization equation, an Euler-Lagrange differential equation can be used as a necessary condition.

$$div\left(\frac{\nabla U}{|\nabla U|}\right) + \lambda(U - U_o) = 0 \qquad (11)$$

Using Eqn. 11 and the gradient decent method, we can iteratively update and ultimately reach the optimal value. The updating process is given in Eqn. 12. and Eqn. 13 respectively.

$$U_t = div\left(\frac{\nabla U}{|\nabla U|}\right) - \lambda(U - U_o) \qquad (12)$$

$$= \frac{\partial}{\partial x}\frac{U_x}{\sqrt{U_x^2 + U_y^2}} + \frac{\partial}{\partial y}\frac{U_y}{\sqrt{U_x^2 + U_y^2}} - \lambda(U - U_o)$$

$$\lambda = \frac{1}{\sigma^2}\int_\Omega div\left(\frac{\nabla U}{|\nabla U|}\right)(U - U_o)dU \qquad (13)$$

Enforce Film Grain Properties for Total Variation Minimization

When restoring the pure image using a total variation minimization method, some embodiments make use of special characteristics of film grain noise. In the case of a single channel input image, i.e. gray or luminance channel, properties 2 and 4 from Paragraph [0016] can be used. Since it has spatial correlation among its neighborhood pixels, we can apply a whitening process to make the noise white. Thanks to its Gaussian distribution, we can introduce the relationship as Eqn. 14.

$$U - U_o = Pw \qquad (14)$$

where P is a transformation matrix from white signal w to the obtained noise. Then, Eqn. 10 can be rewritten as Eqn. 15 using Eqn. 14.

$$\bar{U} = \underset{U}{\operatorname{argmin}}\left[F(U) + \frac{\lambda}{2}(U - U_o)^T R^{-1}(U - U_o)\right] \qquad (15)$$

where $R = PP^T$ is the auto-correlation matrix of $(U - U_o)$. For all derivation for these equations, we simplify them by assuming the M×M input image as a 1D vector, e.g., U is an $M^2 \times 1$ vector and P is an $M^2 \times M^2$ vector. In some embodiments, we can approximate to reduce the dimension of R, so that a 9×9 auto-correlation matrix may be used.

If the input image is an RGB color image, we can additionally use property 3 from paragraph [0016], i.e. cross-color correlation when estimating a denoised image. In these embodiments, a G channel image may be used as a reference image, and the other R and B channel images may be obtained based on information of the G channel. In these embodiments, two constraints may be used at the same time, so that the minimization equation can be modified as Eqn. 16.

$$\bar{U}_B = \underset{U_B}{\operatorname{argmin}}[F(U_B) + \lambda_1(U_B - U_{Bo})^T R_B^{-1}(U_B - U_{Bo}) + \qquad (16)$$

$$\lambda_2(U_G - U_{Go})^T R_{GB}^{-1}(U_B - U_{Bo})]$$

Film Grain Noise Modeling and Synthesis

In some embodiments, a noise analysis and synthesis model may be used. For noise analysis, a few parameters may be determined to represent the extracted noise. In some embodiments, these parameters may be transmitted to a noise synthesizer at the decoder.

Autoregressive (AR) Noise Model

As there is no commonly accepted objective metric to measure the similarity between synthesized and real film grain noise, this process is often done by visual perception. As a result, film grain noise modeling is a challenging problem. However, there are several important factors that affect the visual difference. These factors include the spatial power spectrum density, the noise probability density and the cross-color correlation.

In order to model film grain noise according to the above criteria, consider the following AR model:

$$N(i, j, c) = \sum_{i'}\sum_{j'}\sum_{c'} a_{i'j'c'} \cdot N(i - i', j - j', c - c'), \qquad (17)$$

which is a 3D AR model with the 2D spatial correlation and the 1D spectral correlation.

In some embodiments, the AR model is an IIR filter, which in general has a better frequency representation than an FIR filter. The power spectrum of synthesized noise can be controlled by the frequency response of the IIR filter for a white input signal. Furthermore, embodiments comprising the AR model as given in Eqn. (17) include both spatial and cross-color correlation naturally. Thus, embodiments comprising this model capture desired film grain noise properties well.

Since film grain noise may have the same characteristics over the whole image, some embodiments may only comprise a small number of coefficients for the AR model. Based on empirical results, some exemplary embodiments may utilize values of (i', j', c') that are (1,0,0), (0,1,0), (1,1,0), (−1,1,0), (2,0,0), (0,2,0), and (0,0,1), which result in a causal filter in the raster scanning order, which is convenient for noise synthesis.

Signal Dependent Noise Synthesis

Since film grain noise shows some signal-dependent properties, the synthesized noise may be modified according to the decoded signal. However, it is not easy to hold the cross-color correlation by treating the signal-dependent noise directly. That is, if the generated noise is scaled directly according to the background signal, it is likely to destroy the cross-color correlation. To preserve the cross-color correlation as much as possible in generating signal-dependent noise, the scaled excitation may be used as shown FIG. 5. In some embodiments, instead of scaling the synthesized film grain noise, the excitation white signal may be scaled before its synthesis.

Figure 5:
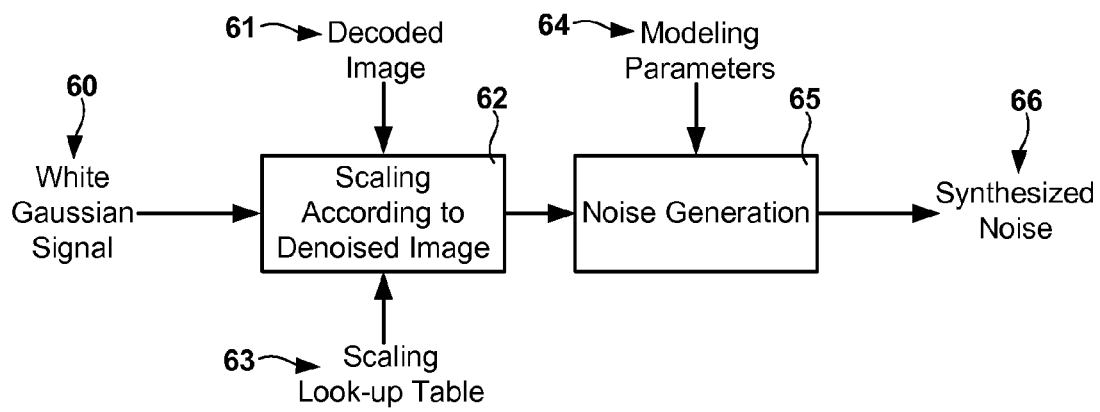
FIG. 5 is a diagram showing noise generation.

Some embodiments of the present inventions may be described with reference to FIG. 5. In these embodiments, a signal-independent noise 60, such as white Gaussian noise is generated and input to a scaling module 62. A decoded image 61 or decoded image characteristic data is also input to the scaling module 62. The scaling module 62 may generate scaling data based on the image or image characteristics 61 or may access a scaling look-up table (LUT) 63 to obtain image-dependent scaling parameters. The image-independent noise 60 may then be scaled in the scaling module 62 using the image-dependent scaling parameters. This scaled noise may then be sent to a noise generation module 65, where noise modeling parameters 64 may be used to synthesize film grain noise. The output of this process is synthesized film grain noise 66.

Output Image Construction

In some embodiments, the noise synthesizer may generate film grain noise that has properties similar to the extracted noise according to the procedures described above. Afterwards, in some embodiments, the final output image may be obtained by $$U_{out}(i,j) = U_{decod}(i,j) + N_{gen}(i,j). \tag{18}$$

where $U_{decod}$ is the decoded image and $N_{gen}$ is the synthesized noise generated by the AR model. In some embodiments, since the signal dependency property has been considered during the noise synthesis step, a simple summation of the decoded image and the synthesized noise is adopted in Eqn. (18).

Since the film grain noise in edge areas is not removed at the encoder side, adding the synthetic noise to the edge area of the decoded image during noise re-synthesis, as shown in Eqn. (18), may potentially cause problems. However, it has been observed that noise in edge regions is much less visible than noise in non-edge regions so that this problem is actually negligible. Furthermore, the decoded image is a reconstruction of the smoothed version of the original image regardless of the compression method actually applied and, consequently, film grain noise in edge regions is somewhat suppressed during the coding process.

Film Grain Noise Synthesis

In some embodiments, temporal independency and Gaussian distribution are automatically satisfied through the use of independent, identically distributed (i.i.d.) Gaussian noise as the excitation signal. In the frequency domain, the power spectrum density determines the visual appearance of noise. Since the signal with stronger low-frequency components is more visible to human eyes while pure film grain noise has higher low-frequency components, it is important to re-synthesize noise to have similar power spectrum density. Likewise, the spatial distribution plays an important role for human perception in the spatial domain. In some embodiments, in the RGB domain, the correlation between three color channels should also be considered when generating noise. Even though each RGB domain has different pixel values, the same film grain noise may be physically created at each pixel so that cross-color correlation is preserved. In addition, a background signal with a different intensity has different noise power, which is also perceptually visible.

Among these criteria, in some embodiments, the matching of cross-color correlation may be the most important one since it leads to intensity compensation between color channels. Due to this reason, white signal scaling may be used in some embodiments to preserve the cross-color correlation.

Some noise synthesis embodiments may comprise a seven-coefficient auto-regressive (AR) model as described above. However, some embodiments may comprise an auto-regressive-moving-average (ARMA) model consisting of more parameters at the cost of higher complexity. Since the performance of a more complicated model is not significantly better, the seven-coefficient AR model is typically accurate enough as far as the power spectrum density is concerned.

In some embodiments, all time-consuming tasks are implemented at the encoder and only simple noise generation and addition is needed at the decoder. Thus, the additional complexity for consumer electronic devices should be negligible. Moreover, some embodiments only need a small number of parameters per frame or per GOP, and these parameters can be transmitted on an auxiliary channel such as SEI messages. As a result, the film grain noise model of these embodiments can be easily added to the many current video coding standards.

Alternative Decomposition Filter Embodiments

Some embodiments of the present invention may comprise two filters, $h=[\frac{1}{4}\ \frac{1}{2}\ \frac{1}{4}]$ and $g=[-\frac{1}{2}\ 0\ \frac{1}{2}]$ as low and high-pass wavelet decomposition filters as an alternative to the filtering methods described above in paragraphs [0029] and [0030].

This may be described as a form of multi-layer decomposition, but can be simplified as a filter-bank, since it uses non-decimated wavelet decomposition. For example, if we use 4-level decomposition, it is the same as using four different filters as shown in Eqn. 19, where * indicates linear convolution.

$$\begin{cases} f_1 = g \\ f_2 = h*g \\ f_3 = h*h*g \\ f_4 = h*h*h*g \end{cases} \tag{19}$$

Figure 6A:
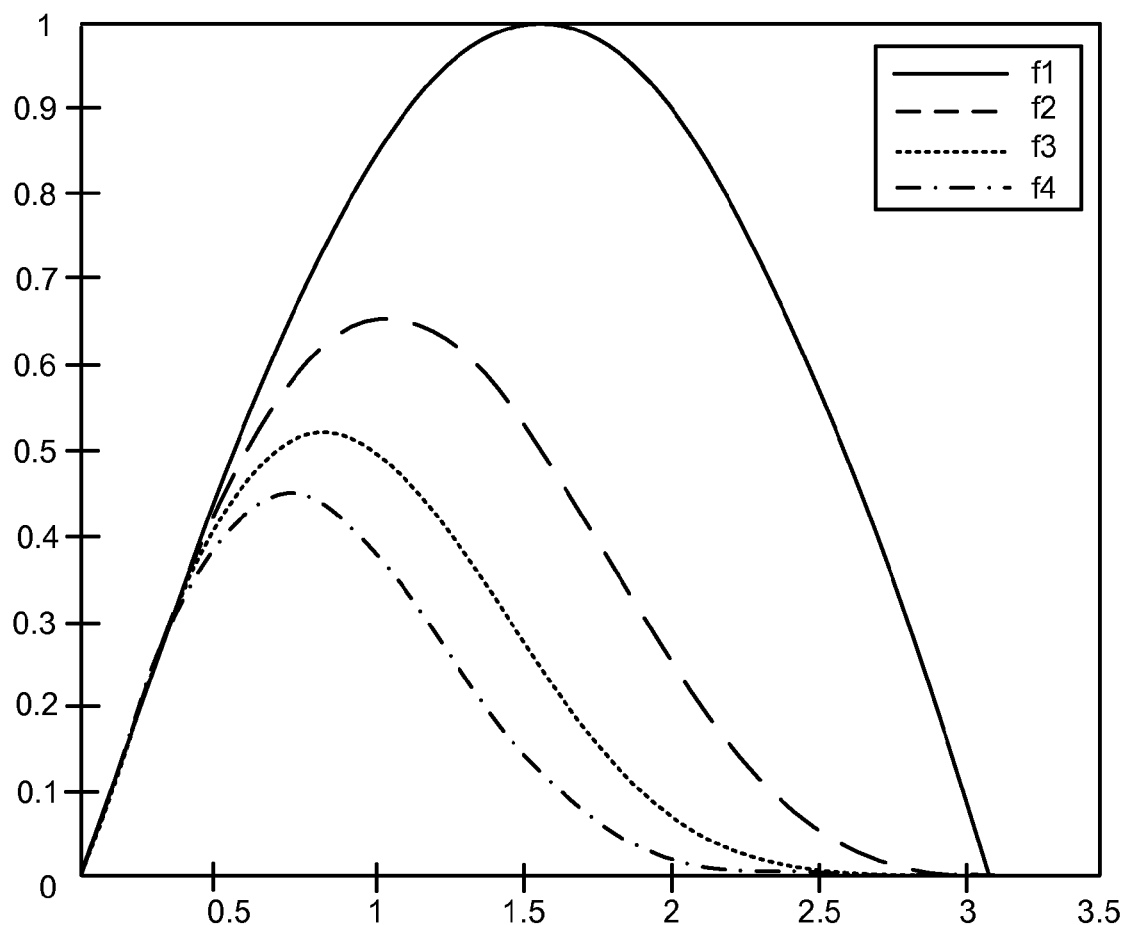
FIG. 6A is a diagram showing the frequency response of Equation 19.
Figure 6B:
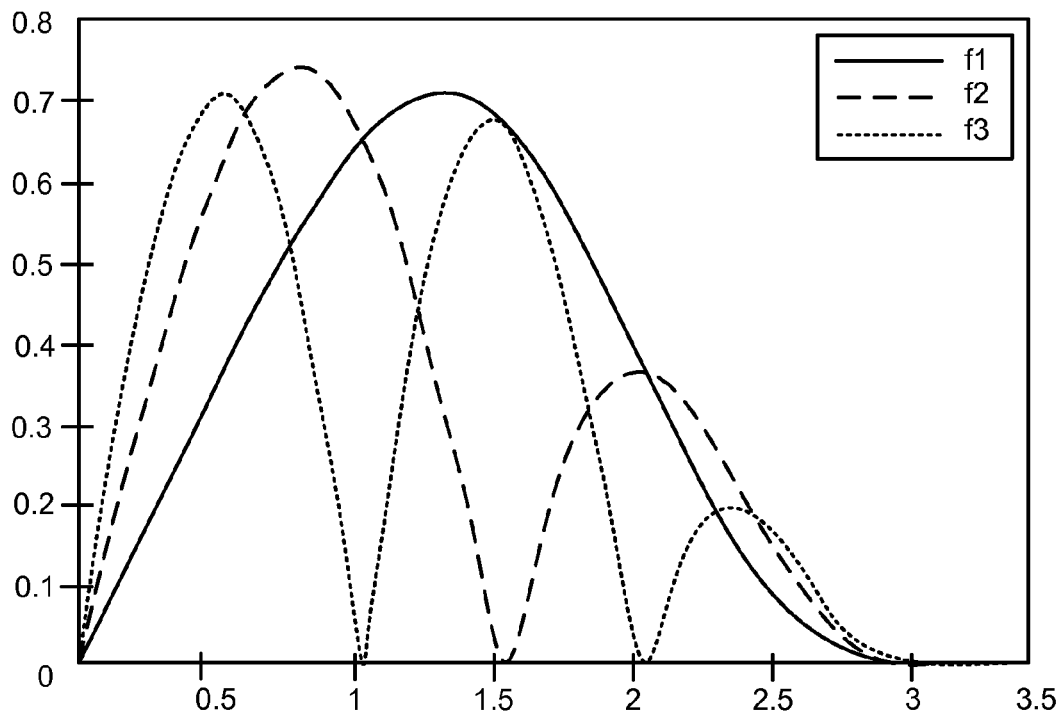
FIG. 6B is a diagram showing the frequency response of Equation 20.

As shown in FIG. 6A, this set of filters is not clearly distinctive of each other. In order to increase the frequency selectivity, we modify the filter coefficients, and finally arrive at the filter coefficients in Eqn. 20. In this case, only three filters are used, which are experimentally chosen. FIG. 6B clearly shows additional frequency selectivity.

$$\begin{cases} h = [-1/8\ \ 1/4\ \ 3/4\ \ 1/4\ \ -1/8] \\ f_1 = h*[-1\ \ 0\ \ 1] \\ f_2 = h*[-1\ \ 0\ \ 0\ \ 0\ \ 1] \\ f_3 = h*[-1\ \ 0\ \ 0\ \ 0\ \ 0\ \ 0\ \ 1] \end{cases} \tag{20}$$

In these embodiments, a unified edge energy map may be obtained by taking maximum value among three edge energy maps as Eqn. 21. Since each level of edge energy map has meaningful information, it is more reasonable to take its maximum value.

$$EE(i,j) = \max(EE_1(i,j), EE_2(i,j), EE_3(i,j)) \tag{21}$$

Dynamic Update of Threshold Values

In these embodiments, the mean may be used to compute a threshold value, since the threshold is mathematically proportional to the mean value. However, there is a possibility of a false decision for pixels around the threshold value. In other words, we may not be sure whether a pixel close to a threshold value is film grain or not. Instead of using all pixels below a threshold value to update the threshold value, these embodiments may use only 70% of the data, and use the median rather than the mean. The median is known to be robust for noise, and is also preserved when considering only 0~70% of the pixels. These embodiments may need more memory space for the pre-processing step to store distribution for the median value. However, the necessary memory size is still small, and, in some embodiments, all processing may be done on the encoder side.

In these embodiments, fine texture detection, denoising, noise synthesis, output image construction and other processes may be performed as described above for other embodiments.

Maximum a Posteriori Noise Estimation

Some embodiments of the present invention comprise methods and systems for denoising an image containing film grain noise in motion pictures. In some embodiments, a Bayesian approach is used to estimate a denoised image. Additionally, some embodiments comprise the use of unique film grain noise properties when estimating the probability of noise extracted along the temporal direction.

Figure 7:
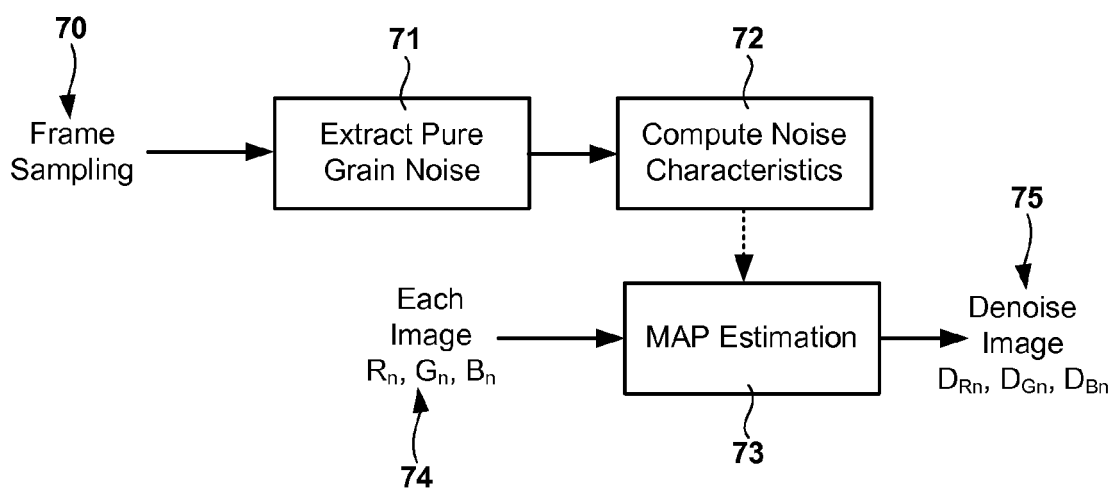
FIG. 7 is a diagram showing embodiments comprising maximum a posteriori noise estimation.

Embodiments of the present invention comprise methods and systems for estimating film grain noise in motion pictures by unique film grain noise properties. The overall system structure of exemplary embodiments is illustrated in FIG. 7. In these embodiments, a sequence of video frames 70 is input to the system. Noise is then extracted or measured 71 from the frames and noise characteristics are computed 72. These noise characteristics are then fed into the maximum a posteriori (MAP) estimation module 73 to be used for noise processing. Images 74 may then be input to the MAP estimation module 73, where image characteristics and the noise characteristics 72 may be used to denoise the input images 74. The video sequence frames 70 may or may not be the same as or related to the input images 74. In some embodiments, some video sequence frames from a video clip may be used as frames 70 for noise characteristic determination 72, but the characteristics derived from those frames may be used in noise estimation 73 and denoising for the entire video clip. Consequently, in some embodiments, noise characteristics do not need to be measured for each frame in a sequence. Further, in some embodiments, noise estimation 73 and denoising do not need to be based on noise characteristics derived from the specific frame on which denoising operations occur.

When extending images to a video sequence, temporal correlation can be a good tool for noise removal. However, all methods with temporal filtering are crucially dependent on the block motion estimation, so that temporal filtering cannot be applied for whole video sequences.

Noise Characteristics by Temporal Motion Estimation

These embodiments, like some described above, comprise methods and systems that utilize one or more unique properties of film grain noise. The grain pattern may vary for different kinds of film and other conditions. Consequently, it is prudent to identify the characteristics of film grain noise for a specific application or specific media or content. Identification of the noise characteristics may help in denoising the image and/or creating a synthetic noise at the decoder to reconstruct the original noisy image. In some embodiments, very similar grain noises may be extracted or identified through temporal correlation between video frames.

$$Y^n = X^n + N(X^n) \quad (22)$$

Eqn. 22 shows a basic model of film grain noise, where Y is the observed image, X is pure image without noise, N is film grain noise and n means $n^{th}$ frame. Since the film grain noise is signal dependent, noise N is a function of the pure image, X. Then, if the blocks of two consecutive frames are static, we can extract the new noise $N^d$ as Eqn. 23, where B' in the $(n-1)^{th}$ frame is the best-matching block of B in the $n^{th}$ frame. The best-matching block may be computed by general block-based, sum of absolute difference(SAD) as shown in Eqn. 24. Since this algorithm only takes static areas of images, it is robust for motion change.

$$\begin{aligned} N_B^d &= N_B^n - N_B^{n-1} \\ &= (Y_B^n - X_B^n) - (Y_{B'}^{n-1} - X_{B'}^{n-1}) \\ &= (Y_B^n - X_B^n) - (Y_{B'}^{n-1} - X_B^n) \\ &= Y_B^n - Y_{B'}^{n-1} \end{aligned} \quad (23)$$

$$SAD = \sum_{i \in B} \sum_{j \in B} \left( Y_{i,j}^n - Y_{i-i',j-j'}^{n-1} \right) \quad (24)$$

As mentioned above, film grain noise may be almost temporally independent and spatially Gaussian. As a result, the difference of two independent Gaussian noises, $N^d$ would be another Gaussian noise with double variance. Furthermore, if we parameterize the film grain noise with an AR model, the AR model parameters of $N^d$ will be exactly identical with $N^n$ or $N^{n-1}$ as shown in Eqn. 25 due to its physical occurrence.

$$\begin{aligned} N_{i,j}^d &= N_{i,j}^n - N_{i,j}^{n-1} \\ &= \left[ \sum_{i'} \sum_{j'} \beta_{i',j'} \cdot N_{i-i',j-j'}^n + W_{i,j}^n \right] - \\ &\quad \left[ \sum_{i'} \sum_{j'} \beta_{i',j'} \cdot N_{i-i',j-j'}^{n-1} + W_{i,j}^{n-1} \right] \\ &= \sum_{i'} \sum_{j'} \beta_{i',j'} \cdot N_{i-i',j-j'}^d + W_{i,j}^d \end{aligned} \quad (25)$$

where W is white Gaussian noise for excitation, and the variance of $W^d$ is twice larger than the variance of $W_n$ and $W_{n-1}$.

Noise Estimation by Bayesian Model

The systems and methods of some embodiments are based on a probability model with maximum a posteriori (MAP) estimation. With the noise model such as Eqn. 22, we want to find a value of x which maximizes a posteriori probability. According to Bay's rule, the a posteriori probability can be expressed as a likelihood and an a priori probability.

$$\overline{X} = \underset{X}{\mathrm{argmax}}\, p(X \mid Y) = \underset{X}{\mathrm{argmax}}\, p(Y \mid X) p(X) \quad (26)$$

The p(X) expresses a priori probability, and it is generally obtained by the assumption that the pure image is a Markov random field (MRF), since the image has strong correlation between neighborhood pixels. Moreover, it has been proved that an MRF can be characterized by its Gibbs distribution $$p(X) = \frac{1}{Z}\prod_{c \in C} f_c(x_i : i \in C) \quad (27)$$

$$= \frac{1}{Z}\exp\left[-\sum_{c \in C} V_c(x_i : i \in C)\right]$$

where C indicates a set of cliques, Z is a normalizing value and V means potential function defined on a clique. In our case, we have used 2nd order cliques.

For the computation of conditional probability, p(Y|X), many image denoising methods assume that noise N is independent, identically distributed (i.i.d.) Gaussian noise. In this case, the probability function can be simply expressed by its mean and noise power. However, this assumption is not appropriate to detect film grain noise due to its spatial correlation and signal dependency. Some embodiments of the present inventions use an AR model to estimate the current noise values, and use its error probability as conditional probability. Please note that an AR model may be used as a kind of linear prediction of a current pixel based on its neighborhood pixels. The noise variance is dependent on the image value X. The error values of linear estimation by an AR model are mostly around zero, and its distribution is close to Gaussian. Since some embodiments also involve a signal-dependent property of film grain noise as well, this can be approximated with a Gaussian model. In these embodiments, the conditional probability may be expressed as $$p(Y_{i,j} \mid X_{i,j}) = K\exp\left(-\frac{|N_{i,j} - n_{i,j}|^2}{2\sigma_{N(X)}^2}\right) \quad (28)$$

where n is the estimated value by AR model, whose parameters may be obtained above.

$$n_{i,j} = \sum_{i'}\sum_{j'} \beta_{i',j'} \cdot N_{i-i',j-j'} \quad (29)$$

If the input images are color, some embodiments may also account for a strong cross-correlation between color channels, e.g., RGB domain, when computing conditional probability in Eqn. 28. Since the conditional probability in Eqn. 28 has a Gaussian distribution, a 2nd order covariance matrix will be enough to form the joint-Gaussian distribution as follows, where each vector includes RGB value, e.g. $\overline{N} = (N_R, N_G, N_B)^t$, and $\Sigma$ is a 3×3 covariance matrix.

$$p(\overline{Y}_{i,j} \mid \overline{X}_{i,j}) = K\exp\left[-\frac{1}{2}(\overline{N}_{i,j} - \overline{n}_{i,j})^t \Sigma^{-1} (\overline{N}_{i,j} - \overline{n}_{i,j})\right] \quad (30)$$

As an option, we can estimate noise value for each RGB color domain separately, as shown in Eqn. 31.

$$\begin{cases} n_{i,j}^G = \sum_{i'}\sum_{j'} \beta_{i',j'}^G \cdot N_{i-i',j-j'}^G \\ n_{i,j}^R = \sum_{i'}\sum_{j'} \beta_{i',j'}^R \cdot N_{i-i',j-j'}^R + \sum_{i'}\sum_{j'} \alpha_{i',j'}^G \cdot N_{i-i',j-j'}^G \\ n_{i,j}^B = \sum_{i'}\sum_{j'} \beta_{i',j'}^B \cdot N_{i-i',j-j'}^B + \sum_{i'}\sum_{j'} \alpha_{i',j'}^G \cdot N_{i-i',j-j'}^G \end{cases} \quad (31)$$

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for denoising image data by a video encoder based on noise parameters, said method comprising:
    receiving a video sequence comprising a first frame and a second frame, wherein said first frame comprises a first region and said second frame comprises a second region, wherein said second region is static in relation to said first region;
    determining a noise image region based on a difference between said first region and said second region;
    measuring at least one noise parameter of said determined noise image region;
    detecting a smooth region of a frame of said video sequence;
    denoising said detected smooth region based on said at least one measured noise parameter as an a priori constraint in a total variation minimization process; and
    sending an encoded image to a video decoder wherein the encoded image is based on the denoised, detected smooth region, and based on said at least one noise parameter.

2. The method of claim 1 wherein said measuring at least one noise parameter comprises determining the variance of said noise image region.

3. The method of claim 1 wherein said measuring at least one noise parameter comprises determining an auto-correlation value of said noise image region.

4. The method of claim 1 wherein said measuring at least one noise parameter comprises determining a cross-color correlation value of said noise image region.

5. A method for denoising image data by a video encoder based on noise parameters, said method comprising:
    receiving a video sequence comprising a first frame and a second frame, wherein said first frame comprises a first region and said second frame comprises a second region, wherein said second region is static in relation to said first region;
    determining a noise image region based on a difference between said first region and said second region;
    measuring at least one noise parameter of said determined noise image region;
    detecting a smooth region of a frame of said video sequence;
    denoising said detected smooth region based on said at least one measured noise parameter as an a posteriori constraint in a maximum a posterior (MAP) process; and
    sending an encoded image to a video decoder wherein the encoded image is based on the denoised, detected smooth region, and based on said at least one noise parameter.

6. The method of claim 5 wherein said measuring at least one noise parameter comprises determining the variance of said noise image region.

7. The method of claim 5 wherein said measuring at least one noise parameter comprises determining an auto-correlation value of said noise image region.

8. The method of claim 5 wherein said measuring at least one noise parameter comprises determining a cross-color correlation value of said noise image region.

9. The method of claim 5 wherein said detecting a smooth region comprises edge detection.

10. A method for image edge detection, said method comprising:
   filtering an image with a first filter to create a first edge energy image;
   quantizing by binary quantization said first edge energy image to generate a first quantized binary edge energy image;
   assessing directionality of said first quantized binary edge energy image to generate a first directional image;
   assigning edge probability values to said first edge energy image to generate a first edge energy map;
   assigning edge probability values to said first directional image to generate a first directionally-based edge map;
   filtering said image with a second filter to generate a second edge energy image;
   quantizing by binary quantization said second edge energy image to create a second quantized binary edge energy image;
   assessing directionality of said second quantized binary edge energy image to generate a second directional image;
   assigning edge probability values to said second edge energy image to create a second edge energy map;
   assigning edge probability values to said second directional image to generate a second directionally-based edge map;
   combining said first edge energy map, and said second edge energy map to generate a combined edge energy map;
   combining said first directionally-based edge map with said second directionally-based edge map, to generate a combined directionally-based edge map; and
   combining said combined edge energy map with said combined directionally-based edge map to create a combined edge map.

11. The method of claim 10 wherein said performing a directionality check comprises calculating auto-correlation values in eight directions.

12. A method for image edge detection, said method comprising:
   filtering an image with a first filter to create a first edge energy image;
   binarizing said first edge energy image to create a first binarized edge energy image;
   performing a directionality check on said first binarized edge energy image to create a first directionality image;
   assigning edge probability values to said first edge energy image to create a first edge energy map;
   assigning edge probability values to said first directionality image to create a first directionality-based edge map;
   filtering said image with a second filter to create a second edge energy image;
   binarizing said second edge energy image to create a second binarized edge energy image;
   performing a directionality check on said second binarized edge energy image to create a second directionality image;
   assigning edge probability values to said second edge energy image to create a second edge energy map;
   assigning edge probability values to said second directionality image to create a second directionality-based edge map;
   combining said first edge energy map and said second edge energy map a combined edge energy map;
   combining said first directionality-based edge map with said second directionality-based edge map to create a combined directionality-based edge map; and
   combining said combined edge energy map with said combined directionality-based edge map to create a combined edge map.

13. A method of preparing data by a video encoder for generating an output video, the method comprising:
   generating denoised image data by removing film grain noise from an input video, wherein the input video comprises a first region of a first frame and a second region of a second frame, and wherein the second region of the second frame is static in relation to the first region of the first frame; and wherein the generating of the denoised image data is further based on determining one or more noise image regions based on a difference between the first region of the first frame and the second region of the second frame;
   generating noise data wherein the generating is based on denoised image data and one or more noise parameters, and wherein the one or more noise parameters are based on an extracted noise image data; and
   combining the generated denoised image data and the generated noise data.

14. The method of claim 13 wherein the one or more noise parameters are further based on the denoised image data.

15. The method of claim 13 wherein the combining further comprises combining the denoised image data, the generated noise data, and the one or more noise parameters.

16. The method of claim 13 wherein the input video comprises the extracted noise image data and wherein the extracted noise image data is based on temporal information.

17. The method of claim 13 wherein the one or more noise parameters are determined based on at least one of: a variance of the noise image region; an auto-correlation value of the noise image region; and a cross-color correlation value of the noise image region.

* * * * *